United States Patent Office 3,017,989
Patented Jan. 23, 1962

---

3,017,989
PRESSURE SENSITIVE ADHESIVE TAPE
Jack S. Swenson, St. Paul, Minn., assignor to Minnesota
Mining and Manufacturing Company, St. Paul, Minn.,
a corporation of Delaware
No Drawing. Filed Mar. 3, 1960, Ser. No. 12,512
4 Claims. (Cl. 206—59)

This invention relates to pressure-sensitive adhesive tapes and sheets having a normally tacky and pressure-sensitive water-insoluble adhesive layer firmly adherently bonded to a thin, strong, flexible, hydrophobic cellulosic backing film, more particularly a film of hydrophobic cellulose ester such as cellulose acetate butyrate.

Cellulose acetate film has been employed as a pressure-sensitive tape backing for many years, but water-permeability and limited outdoor weathering life, especially when the film is pigmented, have restricted its range of application. Higher esters like cellulose butyrate can be opacified with pigment while still retaining outstanding weather resistance, but they are softer, weaker, less solvent-resistant, and lower melting than cellulose acetate. Cellulose acetate-butyrate and cellulose acetate-propionate combine the strength and heat resistance of cellulose acetate with the low moisture-absorption and excellent weather-resistance of the higher cellulose esters; nevertheless, so far as I am aware, such mixed esters have not heretofore been employed as backings for pressure-sensitive tape.

Although cellulose acetate is receptive to pressure-sensitive adhesives (or readily primed by known techniques), cellulose propionate, cellulose butyrate, cellulose acetate-propionate, and cellulose acetate-butyrate are notoriously unreceptive to solutions of rubbery-resins, alkyl acrylate, or other pressure-sensitive tape adhesives. In addition, films comprising cellulose esters containing acyl groups of three or more carbon atoms are often wrinkled, curled, or even destroyed by contact with organic solvents in which pressure-sensitive tape adhesives or potential primers are ordinarily dissolved. Aqueous adhesive primers based on hydrophilic colloidal agglutinants, such as are disclosed in Drew Patent No. 2,328,066 or Coulter Patents No. 2,328,057, are highly effective in bonding pressure-sensitive adhesives to the hydrophilic films of regenerated cellulose for which they are specifically designed, or to other hydrophilic tape backings; but such aqueous primer compositions would not be expected to be, and indeed are not, effective on many hydrophobic backings including hydrophobic cellulosic ester films.

I have now found, surprisingly, that hydrophobic cellulose ester films containing propionyl or higher acyl groups are successfully prepared for application and permanent retention of rubbery-based normally tacky and pressure-sensitive adhesive coatings by applying to such hydrophobic film from aqueous suspension a mixture of a nontacky alkyl acrylate and a soft rubbery material which is compatible with the subsequently applied pressure-sensitive adhesive. Pressure-sensitive adhesive tape products in which cellulose acetate-propionate or cellulose acetate-butyrate films are primed with aqueous compositions of this type and thereafter coated with an appropriate pressure-sensitive adhesive, possess outstanding weathering characteristics, being resistant to exposure to the elements for extended periods of time without cracking, curling, or otherwise deteriorating. The products have high impact strength, uniform texture, and good dimensional stability under widely varying temperatures and humidities. Such tape may be unwound from roll form, adhered to various surfaces, e.g., metal, glass, painted or enameled wood or metal, rubber, etc., and subsequently removed therefrom without any offsetting of the adhesive to the underlying surface.

In one specific and commercially important modification, pressure-sensitive adhesive tape prepared in accordance with the foregoing has been employed in the marking of rubber tires. Segments of the tape carrying suitable identifying indicia are applied to the tire surface by the manufacturer. The tires are thereafter exposed to the elements, as on racks in front of automobile service stations or other retail outlets, where they are frequently and vigorously handled by employees and prospective buyers. Under such conditions, previously available pressure-sensitive adhesive tapes having a cellulosic backing of, e.g., cellulose acetate, have become badly wrinkled, with the exposed film cracking and separating from the adhesive layer. Tape products of the present invention under similar circumstances remain permanently and smoothly bonded in place on the rubber surface.

The nonlimitative examples set forth below will illustrate the product and method of this invention.

*Example I*

To 147 parts of creamed or concentrated natural rubber latex (62.5% solids) was added 100 parts of "Rhoplex B-15" acrylate polymer dispersion (a 46% solids aqueous emulsion of a terpolymer which is predominantly ethyl acrylate, containing minor amounts of methyl acrylate and acrylic acid, sold by Rohm & Haas; compositions of this type are disclosed in McLuaghlin et al. U.S. Patents No. 2,790,735 and 2,790,736). The two latexes were stirred while being mixed and thereafter blended until smooth. The resulting composition was then used to prime an extruded 4-mil white cellulose acetate-butyrate film containing about 10% $TiO_2$ by weight (Tennessee Eastman Resin "Tenite" 457–E–H4). A coating of primer containing approximately 1 grain of solids per 24 square inches was applied, after which the primed film was dried over a hot can for about 10 minutes at 170° F. to evaporate the water. The dried primer coating was firmly anchored, somewhat cloudy, and not sticky to the fingers. Next a coating equivalent to 9 dry grains per 24 square inches of normally tacky pressure-sensitive tape adhesive consisting essentially of 100 parts of natural rubber, 85 parts of "Piccolyte S–85" terpene resin, and two parts "Santovar A" antioxidant, was applied from 18% solids heptane solution and the solvent evaporated. Anchorage of the primer to both the backing and the adhesive was such that the tape when placed in adhesive-to-adhesive contact could be stripped apart without offsetting either the adhesive or the primer layer. Swelling and distortion of the cellulose acetate-butyrate backing was avoided by the use of the aqueous primer dispersion, which surprisingly could be spread in a smooth uniform layer on the hydrophobic film surface and after drying was firmly adherently bonded thereto, the film remaining smooth and unwrinkled.

Two-inch squares of this tape and, for comparison, of a commercial pressure-sensitive adhesive tape comprising a pigmented rubbery-based pressure-sensitive adhesive coating on a clear cellulose acetate film backing, were adhered to synthetic rubber slabs similar in composition to modern automobile tires and placed in a "Weather-O-Meter" test machine. After well over 400 hours of exposure to moisture and ultraviolet light the cellulose acetate-butyrate tape samples were unchanged in appearance, while after less than 100 hours the cellulose acetate tape samples were wrinkled and embrittled; further, they were badly discolored by the leaching of antioxidants, accelerators, oils, etc., into the pressure-sensitive adhesive layer.

In the cellulose acetate-butyrate film of this example, analysis indicated that the ratio of acetyl groups to butyryl groups was about 4:7. Films having a higher percentage of butyryl groups are softer without having appreciably different weatherability.

*Example II*

100 parts of creamed natural ruber latex (62.5% solids) was diluted with 80 parts of water, after which 167 parts of a 45% solids aqueous emulsion of polyethyl acrylate was added while stirring, and the resulting latex composition mixed until smooth. This composition was used to prime both the white 4-mil cellulose acetate butyrate film employed in Example I, and clear transparent hydrophobic 2-mil cellulose acetate-propionate film in which the ratio of acetyl groups to propionyl groups was about 2:3. The total amount of primer applied in each instance was equivalent to about 1 dry grain per 24 square inches. The coated film was then passed, coated side out, over a hot can maintained at 190° F., for 10 minutes, the dried primer having a cloudy appearance and a non-tacky surface. A coating of normally tacky pressure-sensitive adhesive, consisting essentially of 100 parts of natural rubber and 75 parts of "Piccolyte S-115" polyterpene resin was then applied from heptane solution, after which the solvent was evaporated. The resulting tape structures both had extremely good resistance to delamination; upon being adhered to aluminum test panels they remained smooth and attractive after exposure to outdoor conditions for over one year, even though the cellulose acetate-propionate showed some degree of embrittlement.

Where, as in the preceding two examples, the primer consists essentially of a nontacky acrylate ester latex polymer and a rubber latex, the weight ratio of acrylate ester solids to rubber solids may vary from about 0.2/1 to about 10/1, the preferred range being from about 0.5/1 to 1.5/1. If a substantially greater amount of acrylate ester is present, the finished pressure-sensitive tape product tends to fail by separation of the pressure-sensitive adhesive layer from the primer layer. Correspondingly, if substantially lower quantities of acrylate ester are present, the finished pressure-sensitive sheet material tends to fail by insufficient adhesion of the primer coat to the backing film.

It is to be understood that there are many known equivalents for natural rubber latexes, and that, for example, latexes or butadiene-styrene copolymers, polyisobutylene, or butyl rubber may be substituted successfully, provided such rubbery material is compatible with the subsequently-applied pressure-sensitive adhesive. Likewise, it is well known that many rubbery materials may be substituted for the natural rubber shown in the rubber-resin pressure-sensitive adhesives of the preceding examples, again bearing in mind the criterion on compatibility with the rubbery material of the primer.

*Example III*

Approximately equal weights of the "Rhoplex B-15" emulsion referred to in Example I and a 38% solids latex of 95.5/4.5 isooctyl acrylate-acrylic acid copolymer were stirred and blended until smooth to form a primer emulsion. This primer was then coated on the 2-mil transparent cellulose acetate-propionate film of Example II to provide approximately 1 dry grain per 24 square inches, the coating being dried to transparency by passing the film, coated side exposed, over a hot can maintained at 200° F. for approximately 5 minutes. Although thicker layers of the isooctyl acrylate-acrylic acid copolymer may be used as a pressure-sensitive tape adhesive, the thin layer of dried primer was only slightly tacky. The primed and dried film was then coated with 6 to 7 dry grains per 24 square inches of a 20% solids 80:20 heptane:propyl alcohol solution of the same isooctyl acrylate-acrylic acid copolymer, after which the solvent was evaporated and the resulting pressure-sensitive adhesive tape wound in roll form. As in the preceding two examples, the tape could be readily unwound, was flexible and strong, resisted separation of both the adhesive layer from the primer and the primer from the backing, and was not adversely affected by prolonged exposure to the elements.

Where the term "nontacky acrylate ester" is used in this specification, I refer to a polymeric acrylate or methacrylate which is no more than slightly sticky to the fingers when dry and is hence unsuitable as an adhesive for pressure-sensitive tape. Suitable "nontacky" esters include methyl, ethyl, propyl, and butyl acrylates or methacrylates; higher esters which may be classified as pressure-sensitive tape adhesives are generally less effective for these purposes. Suitable acrylates or methacrylates may also be copolymerized with up to equal molecular amounts of other vinyl monomers, e.g., vinyl acetate or vinyl chloride, or 1–5% of itaconic acid, methacrylic acid, acrylic acid, or maleic anhydride. The term "normally tacky acrylate ester" is used to designate acrylate esters or copolymers which when dried are sticky to the fingers. It has been found that the ratio of "nontacky" acrylate ester polymer solids to "normally tacky" acrylate ester polymer solids in the primer compositions hereof as employed in connection with acrylate pressure-sensitive adhesives, as in Example III, may vary from .02/1 to 10/1, with the preferred ratio being in the range of from about .04/1 to 2.5/1. As is the case with the nontacky acrylate ester:rubber latex blends, increasing the amount of normally tacky acrylate adhesive tends to cause failure of the finished tape by separation of the primer from the backing; further it is difficult to apply additional coatings to the already tacky surface. Pressure-sensitive acrylate tape adhesives have marginal or unsatisfactory adhesion to a primer layer consisting entirely of nontacky acrylate ester, although the inclusion of extremely small amouns of normally tacky acrylate ester in the primer will usually provide good anchorage.

It is to be understood that the invention disclosed herein is to be limited only by the ambit of the appended claims.

What is claimed is as follows:

1. A roll of pressure-sensitive adhesive tape capable of being unwound therefrom in normal use, and of being adhered to the surface of automobile tires and thereafter subjected to outdoor conditions for long periods of time without embrittling, distorting, delaminating, or discoloring, said tape comprising a flexible opaque cellulose acetate-butyrate film backing and a coating of rubber-resin type pressure-sensitive adhesive firmly adherently bonded thereto by a thin intervening primer layer comprising in uniform admixture the dried deposition product of an aqueous emulsion of (a) a non-tacky alkyl acrylate ester polymer derived from an alcohol containing not more than four carbon atoms and (b) a soft, readily deformable rubber of the same type as that contained in said pressure-sensitive adhesive, the weight ratio of alkyl acrylate polymer to rubber in said primer layer being in the range of from about 0.5/1 to 2/1.

2. Pressure-sensitive adhesive sheet material capable of being wound in roll form and unwound therefrom in normal use, and of being adhered to the surface of automobile tires and subjected to outdoor conditions for long periods of time without embrittling, distorting, or delaminating, said sheet material comprising a flexible hydrophobic cellulosic ester film backing having a melting point in excess of 200° F. and essentially containing acyl groups which have at least three carbon atoms, and a coating of rubbery-base pressure-sensitive adhesive firmly adherently bonded thereto by a thin intervening primer layer comprising in uniform admixture the dried deposition product of an aqueous emulsion of (a) a polymeric alkyl acrylate ester which is capable of forming a substantially tackfree film and (b) a soft, readily deformable rubbery polymeric material which is compatible with said pressure-sensitive adhesive.

3. A roll of pressure-sensitive adhesive tape capable of being unwound therefrom in normal use, and of being subjected to outdoor conditions for long periods of time without embrittling, distorting, or delaminating, said tape comprising a flexible hydrophobic backing selected from the class of mixed cellulose esters consisting of cellulose acetate-propionate and cellulose acetate-butyrate, and a coating of rubber-resin type pressure-sensitive adhesive firmly adherently bonded thereto by a thin intervening primer layer comprising in uniform admixture (a) from about 0.2 to about 10 parts by weight of an alkyl acrylate ester polymer derived from an alcohol containing not more than four carbon atoms and (b) one part by weight of a soft, readily deformable rubber which is compatible with said pressure-sensitive adhesive.

4. A roll of pressure-sensitive adhesive tape capable of being unwound therefrom in normal use, and of being adhered to the surface of automobile tires, subjected to outdoor conditions for long periods of time and thereafter removed without embrittling, distorting, or delaminating, said tape comprising a flexible film backing consisting essentially of mixed cellulose esters selected from the class which consists of cellulose acetate-propionate and cellulose acetate-butyrate, and a coating of an acrylate type pressure-sensitive adhesive firmly adherently bonded thereto by a thin intervening primer layer comprising in uniform admixture (a) at least about 0.02 part by weight of a non-tacky alkyl acrylate ester polymer derived from an alcohol containing not more than four carbon atoms and (b) one part by weight of a normally tacky rubbery material consisting essentially of an acrylate ester which is compatible with said pressure-sensitive adhesive.

References Cited in the file of this patent

UNITED STATES PATENTS 2,937,956     Fendius et al. _____ May 24, 1960

FOREIGN PATENTS 544,906     Canada _____ Aug. 13, 1957

UNITED STATES PATENT OFFICE
CERTIFICATE OF CORRECTION

Patent No. 3,017,989  January 23, 1962

Jack S. Swenson

It is hereby certified that error appears in the above numbered patent requiring correction and that the said Letters Patent should read as corrected below.

Column 1, line 34, the upside-down line should read -- unreceptive to solutions of rubber-resin, alkyl acrylate, or --; line 42, for "Patents" read -- Patent --; column 3, line 53, for "criterior on" read -- criterion of --; column 4, line 36, for "amouns" read -- amounts --.

Signed and sealed this 28th day of August 1962.

(SEAL)
Attest:

ESTON G. JOHNSON
Attesting Officer

DAVID L. LADD
Commissioner of Patents